United States Patent [19]
Horie et al.

[11] Patent Number: 5,016,126
[45] Date of Patent: May 14, 1991

[54] DEVICE FOR CONTROLLING AN ACCESS OPERATION OF AN INFORMATION RECORDING AND REPRODUCING DEVICE

[75] Inventors: Nobuyuki Horie; Yoshiki Nishioka, both of Tenri; Toshihiro Yamanaka, Ikoma; Yoshio Yuki, Nabari, all of Japan

[73] Assignee: Sharp Kabushiki Kaisha, Osaka, Japan

[21] Appl. No.: 400,790

[22] Filed: Aug. 30, 1989

[30] Foreign Application Priority Data

Sep. 2, 1988 [JP] Japan .................. 63-220712

[51] Int. Cl.$^5$ .................. G11B 5/55; G11B 21/08
[52] U.S. Cl. .................. 360/78.07; 360/78.11; 369/32
[58] Field of Search .......... 360/78.01, 78.04, 14 78.14; 369/32, 33, 41; 358/907

[56] References Cited

U.S. PATENT DOCUMENTS 3,699,555 10/1972 Du Vall .
4,954,909 9/1990 Sengoku .................. 360/78.04

FOREIGN PATENT DOCUMENTS 272076 6/1988 European Pat. Off. .
58-153276 7/1983 Japan .
58-177573 10/1983 Japan .
63-279478 11/1988 Japan .

Primary Examiner—Aristotelils M. Psitos
Assistant Examiner—Steven R. Garland

[57] ABSTRACT

A device for controlling an access operation of an information recording and reproducing device to a target position for rough access in a disk-shaped recording medium prior to a precision access to a final target position, including a head carried by an actuator, a scale, a counter, a comparator, a timer, and a controller. The scale emits pulses while the head is traveling. The counter counts the pulses and then provide the count to the comparator, which calculates a difference between the count and an access distance to be traveled for rough access and then compares the difference with a value which is determined in advance in consideration of a tolerable error. The comparison result is input into the controller. If the comparison result received when the timer finishes measuring the specified time indicates that the difference between the access distance and the count falls within the range of the predetermined value, the controller decides that the actual rough access operation has been normally finished as desired, thereby decreasing a wrong judgement with respect to finish of the rough access irrespective of a value counted by the counter.

4 Claims, 4 Drawing Sheets

DEVICE FOR CONTROLLING AN ACCESS OPERATION OF AN INFORMATION RECORDING AND REPRODUCING DEVICE

BACKGROUND OF THE INVENTION

The present invention relates to an access control device for a disk-based recording and reproducing system, and particularly to an access control device which is so designed as to provide a high precision rough access to a target position by preparing in advance reference velocity information corresponding to various access target positions.

The access methods used in devices which record to and/or reproduce a disk-shaped recording medium in which information is recorded in concentric tracks or a spiral track divided into a specific number of recording units generally include rough and precision access controls. Rough access is used to position a recording/reproducing portion such as a head or a pick-up near a target track. Precision access following the rough access positions the recording/reproducing portion using servo control to the final target track and sector. Rough access is usually accomplished by means of a linear motor or similar drive, and by increasing the rough access precision, the time required for precision access can be shortened and the efficiency of the system can as a result be increased.

The first inventor, et al. of the present invention have previously proposed an access control device which was so designed as to accomplish a rough access with precision by making use of a relationship between physical positions and velocities of the recording/reproducing portion (Japanese Pat. application No. 62-113383, Laid-open No. 63-279478).

According to the access control device, a travel signal generator which may be a scale or similar device generates a travel signal corresponding to the movement of the recording/reproducing portion, and the travel signals are counted by a counter, so that an actual travel distance of the recording/reproducing portion is measured. Velocity control is carried out based on the actual travel distance and a target distance which must be traveled for rough access.

If the counter indicates zero, for example, as a predetermined counted value, when a predetermined time has elapsed after the rough access begins, the access control device judges that the recording/reproducing portion has traveled the target distance and informs a host controller device that the rough access has been normally finished. On the other hand, if the counter does not indicate zero at that time, the access control device considers that the rough access resulted in an error finish and informs the host controller device of the error.

However, if a recording and reproducing device provided with the above access control device is positioned with inclination, it is very possible for the counter not to be able to count correctly. In this case, even when the rough access is normally finished, the access device will wrongly inform the host controller device of an error finish of the rough access, when the host controller device must carry out an error routine which would not be required with a correct indication of the counter. This causes a time delay before servo control begins for driving an actuator carrying the recording/reproducing portion in the precision access stage.

SUMMARY OF THE INVENTION

Therefore, the object of the present invention is to provide a device for controlling a rough access of a recording and reproducing device to a target position, which can correctly judge that a rough access to a target position is normally finished even when an actual measured travel distance of a head or similar device does not agree with a value of an access distance which must be traveled for the rough access because of a bad positioning of the recording and reproducing device or some other reasons, so that a precision access can be started promptly without an error routine which would be executed otherwise.

In order to accomplish the above object, a device for controlling an access operation of an information recording and reproducing device of the present invention has a recording/reproducing means for recording to and reading from said recording medium; an actuating means for actuating the recording/reproducing means; a travel signal generator for generating a travel signal according to a travel distance of the recording/reproducing means; a counting means for counting output from the travel signal generator; a comparing means for calculating a difference between a value indicating an access distance which must be traveled for rough access and a value counted by the counting means and then comparing the difference with a predetermined value which is a tolerable limit; a time measuring means for measuring a specified time after the rough access begins, which corresponds to the access distance; and a discriminating means for discriminating whether or not an actual rough access has been normally finished as desired when the time measuring means finishes measuring the specified time, the discriminating means deciding that the actual rough access has been normally finished if the comparison carried out by the comparing means results in that the difference between the access distance and the counted value falls within the range of the predetermined value.

Using the device according to the present invention, when an access command is received from a host device such as a system controller, a value indicating an access distance which must be traveled for rough access is provided to the comparing means along with a value which may be predetermined in consideration of a possible measurement error caused by a bad positioning condition of the recording and reproducing device or some other similar reasons. At this time, a specified time corresponding to the access distance is set in the time measuring means.

Once the rough access process begins, the travel signal corresponding to the travel of the recording/reproducing means and emitted by the travel signal generator is counted by the counter. This count, which has to indicate an actual travel distance of the recording/reproducing means if the counter works well, is provided to the comparing means so that a difference between the counted value and the access distance to be traveled is calculated. The difference is compared by the comparing means with the predetermined value and the comparison result is sent to the discriminating means.

When the comparison result indicates that the difference is equal to or less than the predetermined value when the time measuring means finishes measuring the specified time, the discriminating means judges the actual rough access to have been normally finished. Therefore an error routine or similar process will not be required to be carried out for the case in which a value counted by the counting means does not correctly indicate an actual travel distance because of a bad positioning condition of the device or some other reasons and therefore the counted value does not agree with the access distance to be traveled though actually the target position for rough access has been accessed. Thus, unnecessary execution of the error routine is prohibited and a precision access can be started promptly and efficiency in the access operation to a final target position improves.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF PREFERRED EMBODIMENTS

Figure 1:
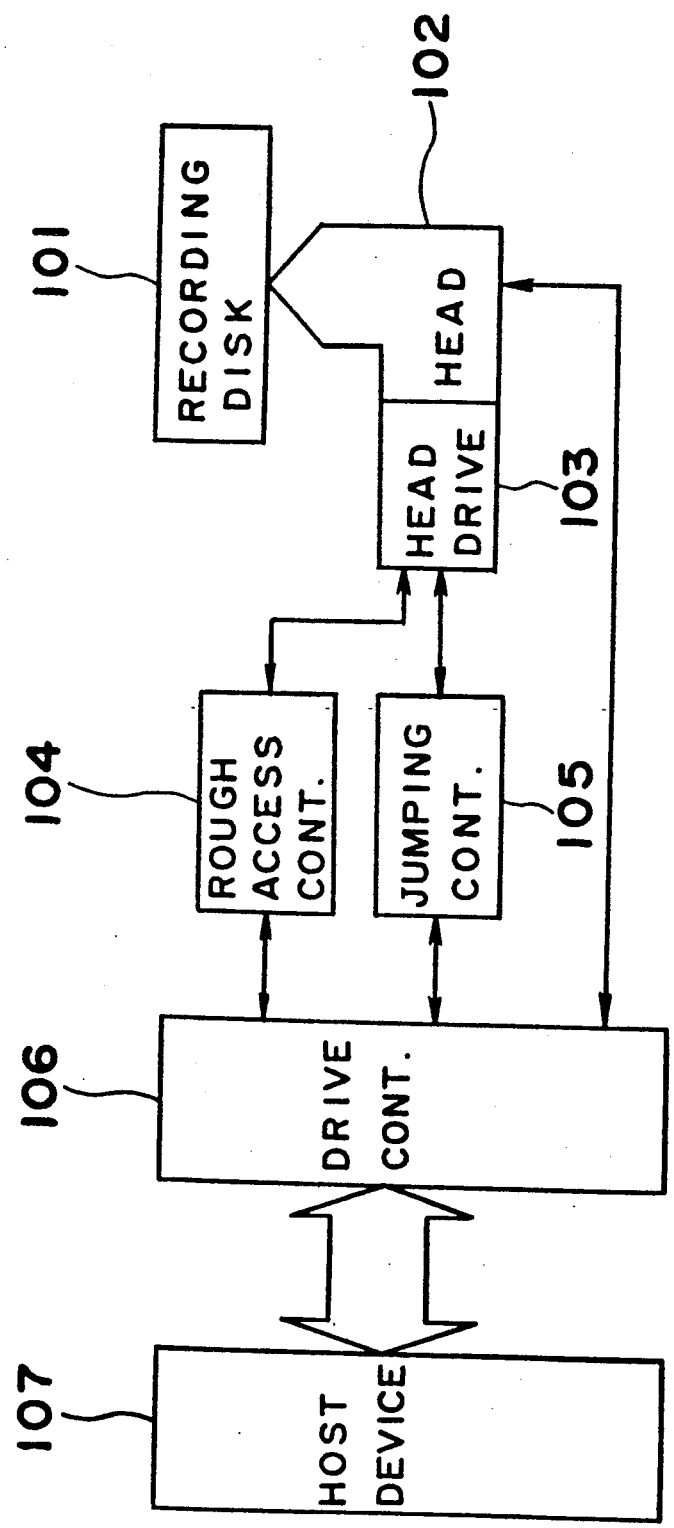
FIG. 1 is a basic block diagram of a device employing the present invention.
Figure 2:
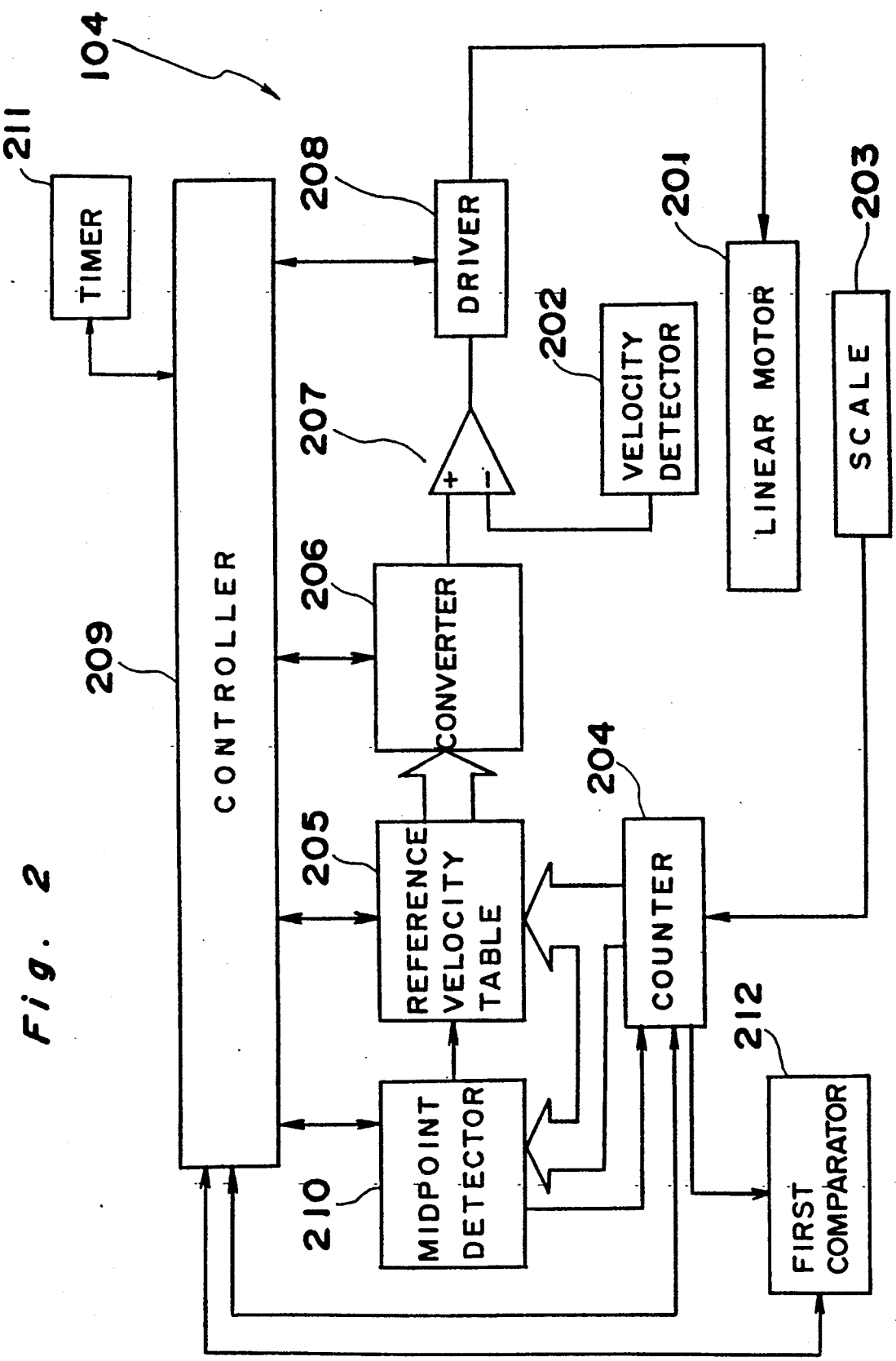
FIG. 2 is a block diagram of a rough access control portion in the device of FIG. 1.
Figure 3:
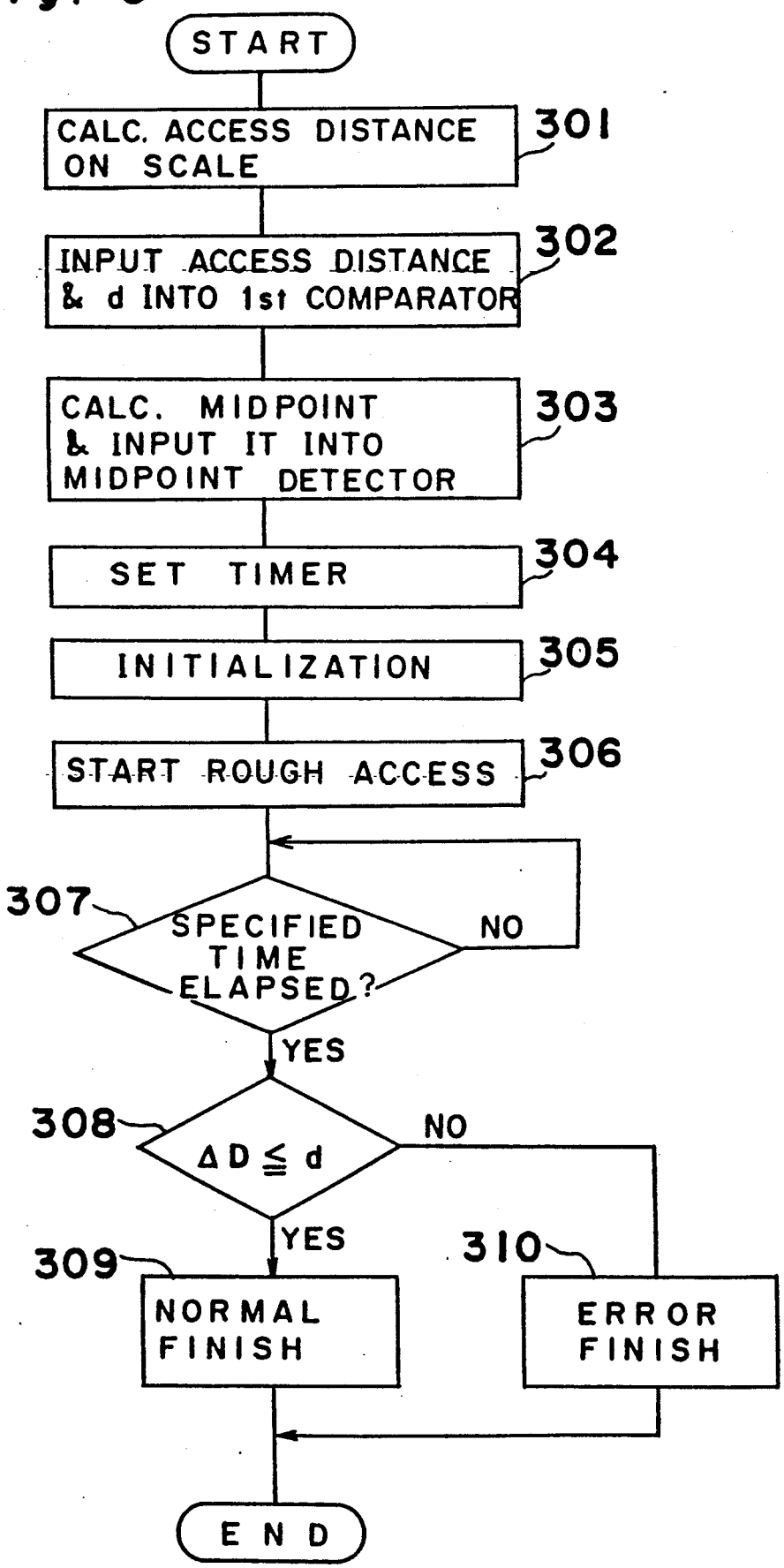
FIG. 3 is a flow chart showing a rough access control process.
Figure 4:
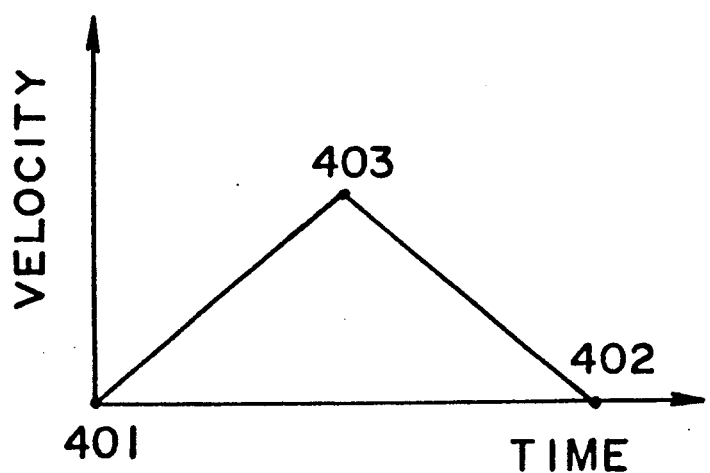
FIG. 4 is a diagram of the velocity control according to the present invention.
Figure 5:
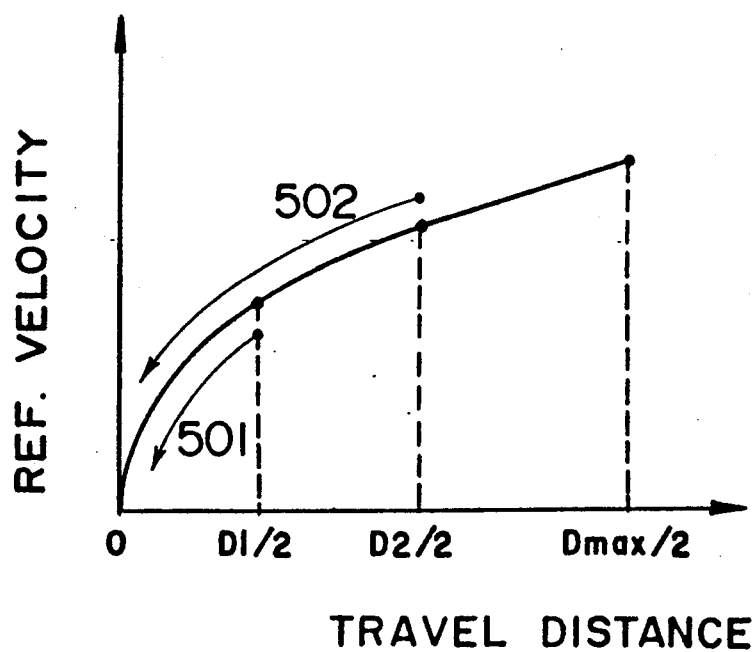
FIG. 5 is a figure showing a reading method used for the reference velocity information.

FIG. 1 is a basic block diagram of a device employing the present invention, FIG. 2 is a detailed block diagram of a rough access control unit of the present invention, FIG. 3 is a flow chart showing a rough access control process according to the present invention, FIG. 4 is a descriptive diagram showing the relationship between the time and velocity according to a rough access control of the present embodiment, and FIG. 5 is a figure showing the relationship between travel distances and the reference velocity information according to the present embodiment.

In FIG. 1, reference number 101 is a recording disk as a disk-shaped recording medium having recording tracks which are spiral or concentric and which are divided into multiple sectors which are the recording unit, 102 is a head as recording/reproducing means used to record to or read from recording medium 101 (102 may be a pickup or other devices), 103 is a head drive mechanism which positions head 102, 104 is a rough access controller used for rough access control of head 102, 105 is a jumping controller 105 used for precision access, 106 is a drive controller used to control the overall device, and 107 is a host device, which may be a computer or other device controlling the drive controller 106. Head drive mechanism include a linear motor and an actuator driven by the linear motor and carrying head 102.

In FIG. 2, 201 is the linear motor to drive the actuator (not shown) carrying the head 102; 202 is a velocity detector which detects a velocity (magnitude and direction) of linear motor 201; 203 is a scale which detects the travel distance and direction of linear motor 201 and generates a pulse signal according to the travel and direction of linear motor 201; 204 is a counter which counts the pulse signals generated by scale 203; 212 is a first comparator which calculates a difference $\Delta D$ between a value counted by counter 204 and a value representing an access distance to be travelled for rough access and then compares the difference $\Delta D$ with a predetermined reference value d; 205 is a reference velocity table as reference velocity generator which may be constituted of a read only memory and generates a reference velocity based on both the distance to be traveled for rough access and the value counted by counter 204. Furthermore, 206 is a convertor which may be a digital to analog convertor and which makes it possible for a second comparator 207 to compare the output of velocity detector 202 with the output of reference velocity table 205; 208 is a driver controlled by the output of second comparator 207 so as to drive linear motor 201; 210 is a midpoint detector that compares a midpoint in the distance to be traveled for rough access with the value of counter 204 and thus detects the actual midpoint of the access distance; 209 is a controller that controls these various components; and 211 is a timer.

The operation of the device so constructed is described hereinbelow with reference to FIG. 1 to FIG. 5.

The rough access operation is executed when an access command is received from host device 107 and it is recognized by drive controller 106 that the rough access is necessary. Since this rough access procedure is based on scale 203, controller 209 first calculates what value the distance to be traveled for rough access would be on scale 203. The result of this calculation is entered into first comparator 212 along with a preset value d. The value d is determined in consideration of a measurement error which would be caused by a positioning condition of the device where a value counted by counter 204 does not correspond to an actual travel distance. The value d is a tolerable limit. Therefore, if the difference $\Delta D$ between the rough access distance and the counted value at the time when a specified time corresponding to the access distance has elapsed is within the range of the predetermined value d, it is considered that the rough access has been normally executed as desired though the counted value does not indicate an expected value.

Before the rough access begins, controller 209 calculates what value on scale 203 one-half the distance to be traveled for the rough access would be, outputs the result to midpoint detector 210, sets timer 211 so as to measure the specified time for deciding a finish time of the rough access, and initializes the entire device.

In order to minimize a total access time, the device according to the present invention causes linear motor 201 to accelerate from a rough access start point 401 to the midpoint 403 of the distance which must be traveled for rough access, and to decelerate from the midpoint 403 to a rough access end point 402, applying so-called triangular control, as shown in the graph of FIG. 4, in which times are plotted on the abscissas, and velocities on the ordinates.

In order to accomplish this type of control, the size of the table used to store the travel velocity data required for all access distances will be extremely large. Therefore, in order to avoid such a problem, the actual midpoint in the access distance is detected by midpoint detector 210 associated with counter 204 to change the reading method used to obtain data from the reference velocity table 205.

Specifically, as shown in FIG. 4, the reference velocities have a symmetrical pattern about midpoint 403. By reversing the direction in which the velocity table is read at midpoint 403, the reference velocity data in the table for acceleration can be also used for deceleration. Thus, in the present embodiment, the reference velocity table is set as shown in FIG. 5. In FIG. 5, the distances to be traveled in the rough access process are plotted on the abscissas, and the reference velocity information is plotted on the ordinates.

For example, if it is now assumed that a point with an access distance D1 is to be accessed, the reference velocity data are read from reference velocity table 205 in the normal direction from travel distance 0 to midpoint D1/2, and then the velocity information is read in the reverse direction (501) from midpoint D1/2 to access target position D1.

Likewise, if another distance D2 is to be accessed, the reference velocity data are read from reference velocity table 205 in the normal direction from travel distance 0 to midpoint D2/2, and from midpoint D2/2 to the access target position D2, the information is read in the reverse direction (502).

Thus, it is not necessary to prepare a large-sized velocity information table for all travel distances. If the maximum access distance in this device is assumed to be Dmax, all rough access distances can be processed if the values of up to Dmax/2 are provided in reference velocity table 205, and the amount of data stored in the reference velocity table, and therefore the size of the table, can be kept very small. In this case, midpoint detector 210 detects the midpoint of the access distance, and thus controls the reading of data from the table in the reverse direction.

Now, the case that the distance to be traveled for the rough access is D1 will be described in accordance with the flowchart of FIG. 3.

Receiving an access command from host device 107 via drive controller 106, controller 209 calculates what value the distance D1 would be on scale 203 at step 301. The result f(D1) of this calculation is entered into first comparator 212 along with the preset value d at step 302. Then, at step 303, controller 209 calculates what value on scale 203 one-half the distance D1 to be traveled for the rough access would be, outputs the result to midpoint detector 210. Timer 211 is set so as to measure a specified time corresponding to the distance D1 at step 304, and then at step 305 the entire device is initialized.

Once the rough access starts at step 306, counter 204 begins to count the output generated by scale 203. The output of counter 204 is input to reference velocity table 205, and a reference velocity corresponding to the count, specifically to a travel distance, is obtained as the output of reference velocity table 205. The output of counter 204 is also input to first comparator 212 in order that first comparator 212 may calculate the difference $\Delta D$ between the value f(D1) and the output from counter 204 and compare the difference $\Delta D$ with the preset value d to discriminate whether or not $\Delta D$ is d or less. The comparison result by first comparator 212 is provided to controller 209.

The output of reference velocity table 205 is converted by convertor 206 to an analog form such that it can be compared with the output of velocity detector 202. Second comparator 207 compares the output of convertor 206 with the output of velocity detector 202, and outputs the difference signal resulting from this comparison to driver 208. Linear motor 201 is driven by driver 208 in response to this difference signal. The velocity information of linear motor 201 is fed back by velocity detector 202 and compared by second comparator 207 in a closed loop so that the velocity of linear motor 201 is regulated to be the velocity output from reference velocity table 205.

The above procedure continues till it is judged at step 307 that the specified time has elapsed, that is, till timer 211 finishes measuring the time. When it is judged that the time has elapsed at step 307, it is discriminated at step 308 whether or not the difference $\Delta D$ between the value f(D1) and the value counted by counter 204 is d or less ($\Delta D \leq d$). If $\Delta D \leq d$, controller 209 considers the present rough access to have normally finished and outputs a signal representative of the normal finish of the rough access to host device 107 via drive controller 106 at step 309. On the other hand, if $\Delta D > d$, controller judges the rough access has erroneously finished and outputs a signal indicative of the error finish of the rough access to host device 107 at step 310 so that an error routine is carried out.

As can be understood from the above description, even though a value obtained by counter 204 after the specified time has passed does not agree with the value f(D1) representing the access distance to be traveled for the rough access, if the difference $\Delta D$ between both the values falls within the range of d, controller 209 of the rough access control device judges that the rough access has normally finished, regarding the value of counter 204 as indicating a wrong travel distance. This method may lower an apparent precision in the rough access, but in practice, this does no harm. The error finish is not wrongly detected and unnecessary execution of the error routine is prevented, thus efficiency in carrying out the access operation improving.

In the present embodiment, a difference value $\Delta D$ between an access distance value to be traveled for rough access and a value counted by the counter is first calculated and then compared with a predetermined value d, but the value counted by the counter may be directly compared with a different kind of predetermined value and when the counted value falls within the range of the predetermined value, the rough access may be regarded as normally finished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for controlling an access operation of an information recording and reproducing device to a target position for rough access in a disk-shaped recording medium prior to a precision access to a final target position, the recording medium having concentric tracks or a spiral track divided into multiple sectors, comprising:
 a recording/reproducing means for recording to and reading from said recording medium;
 an actuating means for actuating the recording/reproducing means;
 a travel signal generator for generating a travel signal according to a travel distance of the recording/reproducing means;
 a counting means for counting an output from the travel signal generator;

a comparing means for calculating a difference between a value indicating an access distance which must be traveled for rough access and a value counted by the counting means and then comparing the difference with a predetermined value which has a tolerable range;

a time measuring means for measuring a specified time after the rough access begins, which corresponds to the access distance; and a discriminating means for discriminating whether or not an actual rough access has been normally finished as desired when the time measuring means finishes measuring the specified time, the discriminating means deciding that the actual rough access has been normally finished if the comparison carried out by the comparing means results in that the difference between the access distance and the counted value falls within the range of the predetermined value.

2. The device as claimed in claim 1, further comprising:

a velocity detection means which detects an actual travel velocity of the recording/reproducing means while the recording/reproducing means is traveling;

a midpoint detection means for detecting an actual midpoint of the access distance by comparing a median value of the access distance which must be traveled for rough access with a value counted by the counting means;

a reference velocity generator for generating a series of reference velocities for the recording/reproducing means so as to accelerate the recording/reproducing means from an access start position to the midpoint of the access distance, and then to decelerate from said midpoint to an access target position;

a further comparing means for comparing the reference velocities generated by the reference velocity generator with the travel velocities detected by the velocity detection means; and a drive means which regulates a travel velocity of the recording/reproducing means based on the result of a comparison by the further comparing means.

3. The device as claimed in claim 2, wherein the reference velocity generator is a look-up table.

4. The device as claimed in claim 3, wherein the look-up table stores reference velocity data corresponding to distances up to half of a maximum access distance, the look-up table being read out in one direction from the access start position to the midpoint of the access distance and in the opposite direction from the midpoint to the access target position.

* * * * *